United States Patent [19]
Rannenberg

[11] 3,915,587
[45] Oct. 28, 1975

[54] VARIABLE SIZE BLEED PORT FOR JET ENGINES

[75] Inventor: George C. Rannenberg, Canton, Conn.

[73] Assignee: United Technologies Corporation, Hartford, Conn.

[22] Filed: Dec. 5, 1974

[21] Appl. No.: 529,993

Related U.S. Application Data

[62] Division of Ser. No. 401,311, Sept. 27, 1973.

[52] U.S. Cl. ................. 415/27; 60/39.29; 137/484; 137/513.5

[51] Int. Cl.² ........................................ F04D 27/02

[58] Field of Search............. 60/39.29, 39.27, 39.23; 415/27, 28; 137/484, 513.5, 499, 402

Primary Examiner—Clarence R. Gordon
Attorney, Agent, or Firm—Norman Friedland

[57] ABSTRACT

A simple, substantially fail-safe jet engine bleed used for aircraft accessories is designed to have a small bleed port area for high power operating conditions of the engine and a larger bleed port area for lesser power operating conditions. The variable port can be made to vary its size in response to the power lever position, engine rpm, compressor bleed temperature or an engine pressure ratio.

2 Claims, 3 Drawing Figures

TO AIRCRAFT ACCESORIES
FROM ENGINE BLEED $P_{REG}$
$P_{BLEED}$ 3,915,587

VARIABLE SIZE BLEED PORT FOR JET ENGINES

This is a division, of application Ser. No. 401,311, filed Sept. 27, 1973.

BACKGROUND OF THE INVENTION

Jet engine powered aircraft typically bleed compressor air from the engine as a source of air supply for accessories such as starters, pneumatic valves, and the like.

It is well known that the compressor bleed manifold of the jet engine always includes an orifice or venturi to protect the engine from being overbled. When this orifice is properly sized to protect the engine at high power operation, it is too small at low power operation and reduces the pressure available for such air-driven accessories. Accordingly, a single bleed port cannot accomplish the two opposing objectives of providing sufficient pressure for air-driven accessories at low engine power and also protect the engine from overbleed at high power. Engine manufacturers tend to use a larger bleed port than they could tolerate if flow were to be controlled by choking. They depend on the airframe manufacturer to provide controls for air flow such that the bleed ports are not choked at high power conditions. The fallacy of this approach is that a significant factor affecting engine life and thrust is no longer controlled by the engine manufacturer. In many cases, the normal operation of accessory systems causes excessive bleed. In other cases, misoperation or malfunction of controls causes excessive bleed.

As for example, when it is desirable to use the last stage bleed for supplying air to an air-conditioning system say in a helicopter powered by a turbine type of power plant, it is particularly important that the opening is limited so that it does not bleed the engine excessively should a malfunction occur. Thus, should the air-conditioning system incur a downstream failure, as for example, a bursted duct, when the bleed is opened to a large size, the engine would evidence a thrust loss and/or overtemperature condition that cannot be tolerated in an aircraft environment. Presently, there are no bleed port configurations available that permit sufficient flow in both the low and high power conditions for helicopter applications that are reliable enough to assure that a malfunction would not adversely affect the performance of the engine.

This invention provides a dual or variable bleed port size for a turbine type power plant. It is contemplated that the variable bleed port affords the necessary degree of reliability to assure that, in the event of a failure, the loss of airflow through the engine will not cause intolerable thrust losses and engine overtemperature conditions. In one aspect of the invention, a butterfly valve is utilized wherein the valve element is undercut a predetermined amount so that the undercut provides low port bleed area when the valve is in the closed position, and the large bleed area is obtained when the valve is in the full open position which is desirable for both the high and lower power engine performance conditions. Obviously, intermediate valve position will provide variable area openings. It is also contemplated that this invention will utilize for a low altitude aircraft means for opening the bleed valve when the bleed pressure exceeds a predetermined given gauge pressure and for high altitude aircraft the means will be responsive to the power lever position, the engine rpm, compressor bleed temperature or engine pressure ratio.

SUMMARY OF THE INVENTION

An object of this invention is to provide an improved compressor bleed port for a turbine type of power plant.

A still further object of this invention is to provide a variable single bleed port for a turbine type power plant having a low bleed port area during high power regimes and a high bleed port area during low power regimes.

A still further object of this invention is to provide in combination a single variable compressor bleed port for a turbine type of power plant in which the low port area is manifested by the valve element and the high bleed port area is manifested by the housing of the valve element, which may include an integral venturi.

A still further object of this invention is to provide a single dual bleed port having both a small and large area which is characterized by its high reliability and its ability to automatically go to the small area in the event of a malfunction.

The foregoing and other objects, features and advantages of the present invention will become more apparent in the light of the following detailed description of preferred embodiments thereof as illustrated in the accompanying drawing.

DESCRIPTION OF PREFERRED EMBODIMENTS

Figure 1:
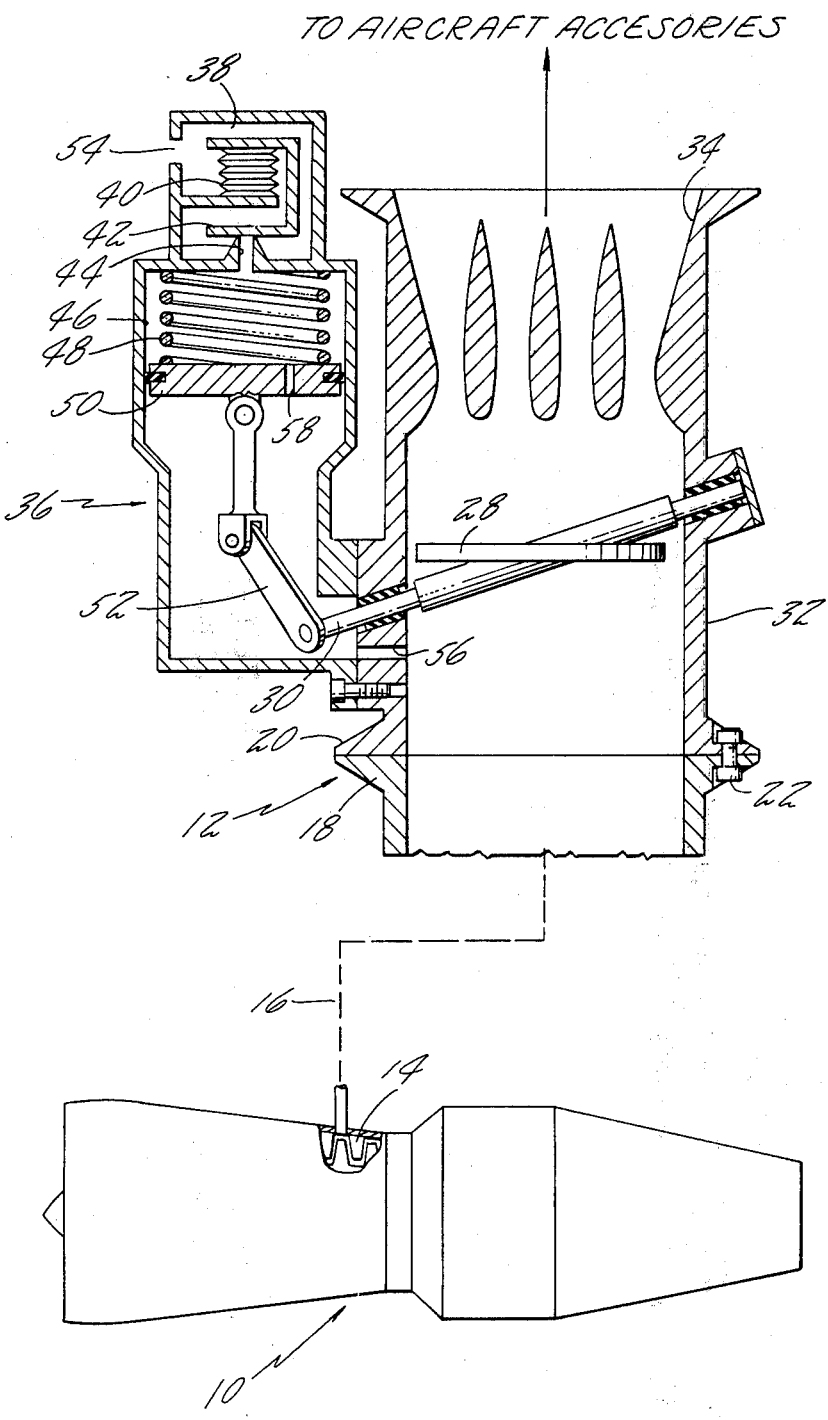
FIG. 1 is a view partly in schematic and partly in section illustrating the details of this invention.

Reference is now made to FIG. 1 which shows the details of this invention in its preferred embodiment wherein a dual bleed is utilized on a turbine type power plant generally illustrated by reference numberal 10 which is of the type utilized to propel aircraft either by developing thrust or driving a load such as a propeller or helicopter. Suffice it to say that the jet engine includes a compressor section which in typical aircraft applications is bled to supply pressurized air as a source for pneumatic accessories, air-conditioning systems and the like. The dual or variable bleed valve generally illustrated by numeral 12 is in communication with the compressor section 14 of the turbine type power plant via the connection 16. Variable bleed valve 12 is basically a self-contained unit which ties into the feed line 16 by the mating flanges 18 and 20 of the connecting line 16 and valve 12 respectively, secured by a plurality of nut and bolt assemblies 22 (only one being illustrated) or other suitable connecting means.

In this embodiment a butterfly type valve including the butterfly disc element 28 suitably secured to the rotatable shaft 30 serves to increase the area in valve 12 between its full closed to full open position. It being understood that the valve disc is undercut so that relative to valve housing 32 when in its full closed position it provides a gap defining the small bleed port. In this instance the downstream half of the butterfly disc is undercut so that the upstream half is larger in area than the downstream thus permitting the disc to blow closed due to the aerodynamic loading if, for example, the linkage should break.

A "pancake" type of venturi may be employed and formed in the valve housing 32. Since the venturi is integral with the valve body both are replaceable as a single unit. This has the advantage of eliminating another connection. The advantage of a "pancake" venturi, as shown, is that it shortens the overall length of the single throat venturi with equivalent or better results, and is lighter and less expensive.

It is therefore apparent from the foregoing that when the butterfly valve disc 28 is in a closed position, the gap between the valve housing and the outer periphery of the valve disc define the small bleed port area, and when the valve disc is in the full open position the venturi 34 forms the large port.

The actuator generally illustrated by numeral 36, suitably attached to the valve housing is combined with the controller 38. This arrangement eliminates connections which has the advantage of eliminating a leaking connection or crack line which can affect the operation. This combined controller and actuator is merely illustrative of a simple type of control which, in this instance, provides a pressure ratio signal (engine pressure to ambient pressure) for positioning the flapper valve element 42 with respect to the bleed orifice 44. Engine bleed pressure enters chamber 46 by means of port 56 and metering orifice 58. (The function of metering orifice 58 may be accomplished by normal leakage past piston 50, although use of metering orifice 58 results in more precise control.) The pressure in chamber 46 is urging flapper 42 to open by reason of acting upon the area of opening 44. At the same time, flapper 42 is urged shut by reason of atmospheric pressure entering chamber 38 through opening 54, and acting upon the area of the evacuated bellows 40. By judiciously selecting the area of opening 44 and the area of bellows 40 the flapper 42 may be caused to open at any predetermined pressure ratio between chamber 46 and ambient.

Thus, spring 48 and pressure in chamber 46 load piston 50 in a valve opening position. High pressure (engine bleed pressure) fed through opening 56 acts on piston 50 urging valve 28 in the closed position. Suitable linkage 52 serves to rotate shaft 30 of the butterfly 28 for opening and closing the same. In this example, the valve is closed and opened at a predetermined engine pressure ratio. Pressure ratio is a significant parameter indicating engine power setting. Thus, the sensor and actuator serve to protect the engine by providing a small bleed port at high engine power and a large bleed port at low engine power. Thus it would be apparent to anyone skilled in the art that the controller in FIG. 1 can be replaced by a power lever, compressor speed or other engine parameter depending on the simplicity and degree of accuracy desired.

Figure 2:
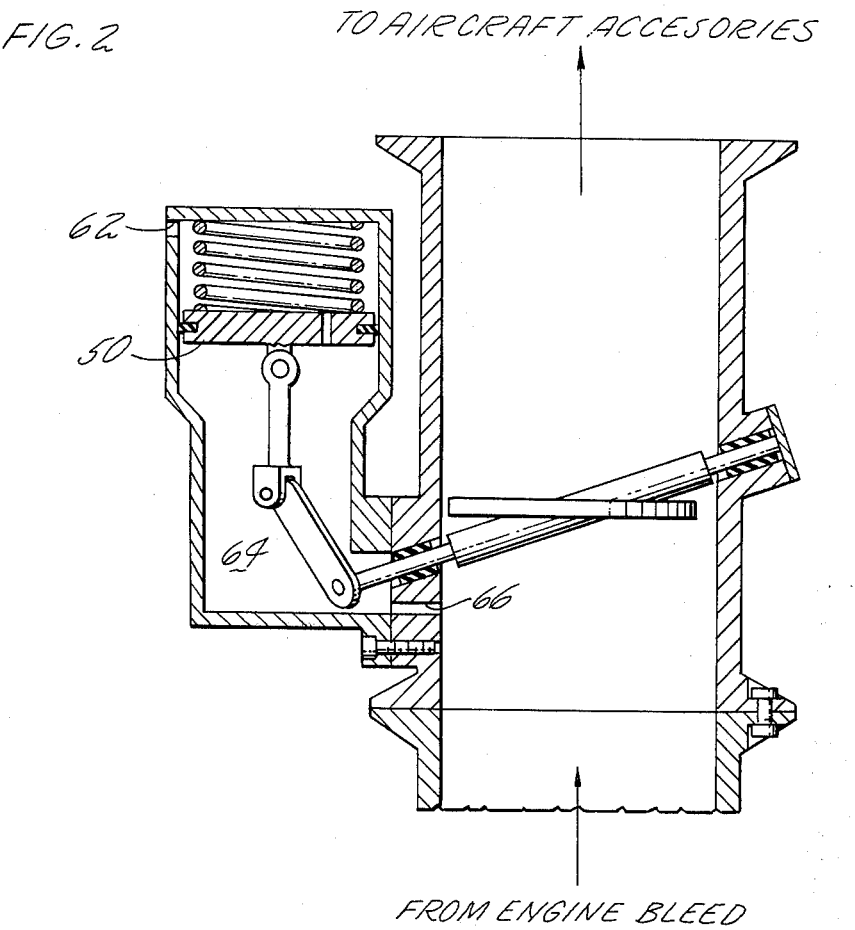
FIG. 2 is a sectional view illustrating another embodiment of this invention.

The embodiment shown in FIG. 2 is essentially the same as the embodiment of FIG. 1 save for the elimination of the venturi and the simplification of the control. In this version the inside diameter of the valve housing is the restriction means and serves as the full area or large bleed port. The piston is exposed to ambient on one side admitted into chamber 60 via port 62 and engine bleed pressure admitted into chamber 64 via port 66. In this instance the valve is opened and closed as a function of the engine bleed gage pressure.

Figure 3:
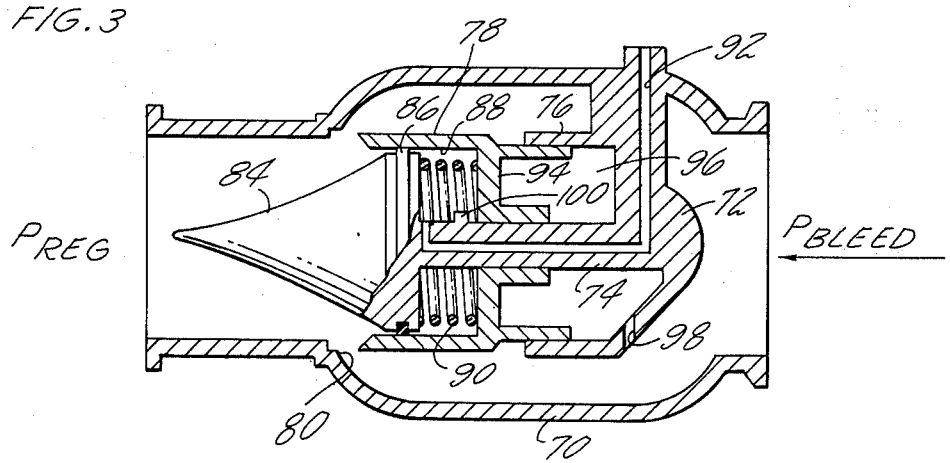
FIG. 3 is an elevated view partly in section illustrating still another embodiment of this invention.

FIG. 3 is exemplary of another type of valve that serves the same function as the butterfly valve, i.e., providing small and large bleed ports except that it utilizes an internal type valve sometimes known as an inline or sleeve type valve. Valve casing 70 is suitably attached to the bleed line similar to the FIG. 1 arrangement. The casing includes a central support spider-like element 72 of which the central portion 74 and annular portion 76 support the sliding valve element 78 in sliding relationship. Sliding valve element 78 which is annularly shaped terminates in proximity to the inner wall 80 of casing 70 and acts as the metering orifice as did the butterfly disc in FIG. 1. A plug-like element 84 attached to or made integral with central support portion 74 as shown, or alternatively integral with the casing 70, serves two functions, namely, 1) carries seal 86 to seal chamber 88 from downstream pressure and 2) is contoured to define together with the inner surface of casing 70, a venturi section, which latter feature is optional. Spring disposed in chamber 88 bears against a face of fixed plug 84 and urges valve element 78 open. This force together with ambient pressure or control pressure admitted through drilled passage 92 is counterbalanced by engine bleed pressure acting on face 94 admitted into chamber 96 via bleed 98. The control pressure admitted to passage 92 may be ambient pressure, or any other generated pressure selected to achieve the desired switch point from the small bleed port to the large bleed port. Stop 100 prevents the valve element 78 from full closure thus, providing the small bleed port. Obviously, should spring 90 break the high pressure assures that the valve will move to the small bleed port.

As pointed out above, the use of a venturi in the large area or open position is not an essential feature of this invention, although the combination, if required provides a useful and efficient means for limiting flow. Under certain circumstances as will be apparent to one skilled in the art, the bleed ports themselves may serve as the flow limiting means.

What has been shown by this invention is a simple, yet highly reliable, inexpensive means for obtaining variable engine bleed port sizes. It affords the advantage of providing a higher thrust rating for a given engine than heretofore realized over the same life cycle. In a multi-egine installation, the nonuniformity of bleed between engine would be essentially eliminated. Thus, without limitation, this invention provides these advantages:

1. Increasing engine thrust ratings (due to lower maximum bleed flows at high engine power).

2. Increased engine warranty life (due to lower maximum engine temperature at high engine power).

3. Lighter weight air-powered accessories, and bleed system components (due to higher bleed pressure available at engine idle).

4. Less volume required around the engine for bleed ducts, precoolers and the like (due to both higher bleed pressure available at idle, and lower bleed flow at high engine power).

5. Improved performance and capacity of air-powered accessories at idle, particularly air-conditioning system cooling capacity (due to higher bleed pressure available at low engine power).

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of my invention, that which I claim as new and desire to secure by Letters Patent of the United States is:

1. Apparatus for defining a variable bleed port for the compressor section of a turbine type of power plant including a connection communicating with the compressor section for supplying air intended to be used in an aircraft, a valve housing disposed in said connection, a valve element supported for longitudinal movement in a central bore in said housing, a reduced diameter section defining a seat for said valve element, said valve element having a piston-like extension on one end and defining a pair of reaction faces, one of said faces exposed to a controlled pressure and the other of said faces exposed to the compressor section pressure whereby the difference in pressure on both faces positions said valve element relative to said seat, means for preventing said valve element to seat so as to define a given small port size, means in said valve housing defining a restriction so as to define the large port size when said valve element is positioned remote from said seat.

2. Apparatus as defined in claim 1 wherein said means defining a restriction is a venturi.

* * * * *